United States Patent [19]

Nakamura et al.

[11] Patent Number: 4,581,728

[45] Date of Patent: Apr. 8, 1986

[54] PLURAL BEAM TRACKING SERVO INCLUDING DELAY COMPENSATION

[75] Inventors: Masafumi Nakamura, Yokohama; Shigeki Inoue, Toyokawa, both of Japan

[73] Assignee: Hitachi, Ltd., Tokyo, Japan

[21] Appl. No.: 503,561

[22] Filed: Jun. 13, 1983

[30] Foreign Application Priority Data

Jun. 16, 1982 [JP] Japan .................. 57-102025

[51] Int. Cl.⁴ ................ G11B 21/10; G11B 7/12; G11B 7/135
[52] U.S. Cl. ........................ 369/46; 369/44
[58] Field of Search ................ 369/43–46; 358/342; 250/201 DF, 202

[56] References Cited

U.S. PATENT DOCUMENTS

| | | | |
|---|---|---|---|
| 3,876,842 | 4/1975 | Bouwhuis | 369/46 X |
| 4,051,527 | 9/1977 | Braat | 369/45 |
| 4,243,848 | 1/1981 | Utsumi | 369/45 |

Primary Examiner—Raymond F. Cardillo, Jr.
Assistant Examiner—Robert Weinhardt
Attorney, Agent, or Firm—Antonelli, Terry & Wands

[57] ABSTRACT

A tracking servo circuit for controlling an optical pickup is used in a tracking error detecting device including an optical system for forming on an optical disc a main light spot for illuminating a pit on the optical disc and forward and backward sub-light spots. The forward and backward sub-light spots are disposed before and behind the main light spot in the moving direction of a track with a small distance between each of the sub-light spots and the main light spot and are shifted from the center line of the track, so that a half of each sub-light spot area is placed on the pits of the track. The tracking servo circuit includes photodetectors for detecting reflected light based upon the forward and backward sub-light spots, a tracking-error-signal detecting circuit for detecting a difference between output signals from the photodetectors, a tracking control circuit for controlling on the basis of an output signal from the tracking-error-signal detecting circuit an optical pickup for reading out a recorded signal which is recorded on a spiral track of the optical disc in the form of a row of pits, and a delay circuit for delaying the output signal from the photodetector. A difference between the output signal delayed by the delay circuit and the output signal from the photodetector is used as a tracking error signal.

3 Claims, 10 Drawing Figures

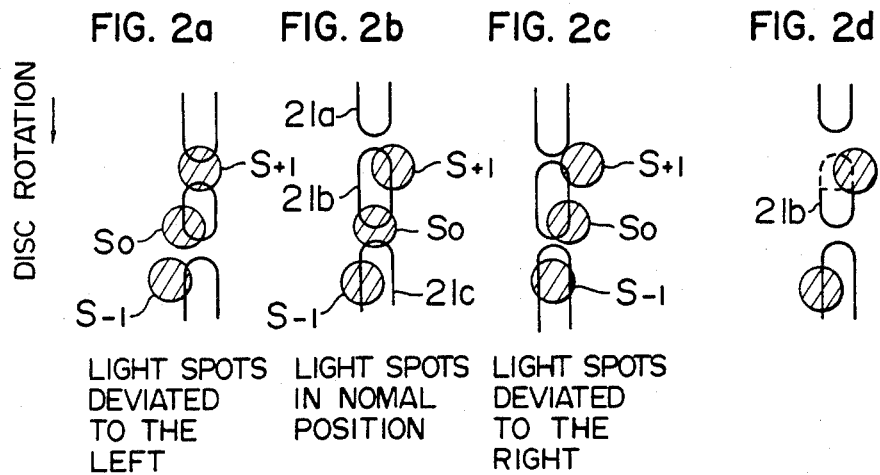
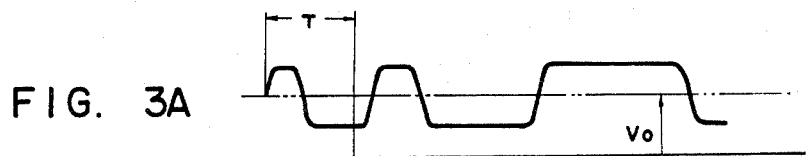
FIG. 3A
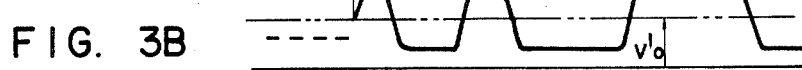
FIG. 3B
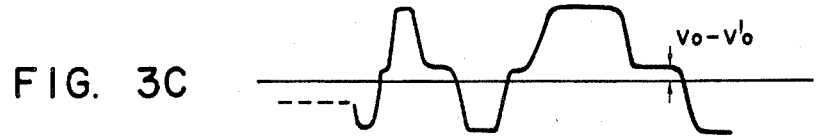
FIG. 3C

PLURAL BEAM TRACKING SERVO INCLUDING DELAY COMPENSATION

The present invention relates to a tracking servo circuit for an optical disc reproducing device, and more particularly to an improvement in a circuit for detecting a tracking error.

An optical disc reproducing device, for example, a disc player in which a digital signal recorded on an optical disc in the form of a row of small pits, that is, elliptical projections is read out by a laser beam and then converted into an analog signal to obtain a reproduced signal, is provided with a tracking servo circuit such as mentioned below. That is, a main light spot for reading out a PCM signal recorded on an optical disc and two sub-light spots for detecting a tracking error are formed on the disc in such a manner that the sub-light spots are disposed before and behind the main light spot with only a small distance between each of the sub-light spots and the main light spot. These sub-light spots are somewhat shifted from the center line of a track to both sides thereof. The quantity of reflected light based upon each of the sub-light spots is detected, and a difference between electrical signals corresponding to such light quantities is detected as a tracking control signal, namely, a tracking error signal. The tracking error signal thus obtained is applied to an actuator for driving an objective lens, which is placed face to face with the optical disc, to place the main light spot precisely on the track.

The above-mentioned method of detecting a tracking error is called the three-spot method, since three light spots are used. According to a tracking servo circuit based upon the three-spot method, it can be seen whether a main light spot for reading out a recording signal is placed precisely on a track or not, by comparing levels of two electrical signals each of which correspond to the quantity of reflected light based upon one of the sub-light spot.

However, in the case where a flaw is present in a surface of the disc, that is, on a signal plane, a great difference arises between these two electrical signals, notwithstanding the main light spot is placed precisely on the track. The above-mentioned difference between the electrical signals may cause the actuator to operate, and thus the main light spot for reading out a recording signal is moved greatly to the left or right, that is, deviates from the track. In the worst case, the main light spot jumps to adjacent tracks or rows of pits.

Further, according to the deviation of the main spot, the PCM signal, namely, the recording signal may be mixed with the tracking error signal, and a low-frequency component of the PCM signal makes the actuator vibrate. Such vibration causes noise. That is, the tracking servo circuit has a drawback that the noises are caused by the actuator.

It is therefore an object of the present invention to provide a tracking servo circuit in which an erroneous tracking operation due to a flaw on an optical disc is prevented, no noise occurs and which is stable to variations in the characteristic of optical disc, and which can perform an accurate tracking operation.

In order to attain the above object, according to the present invention, two sub-spots, namely, sub-light spots for detecting a tracking error are disposed before and behind a main spot, namely, a main light spot for reading out a recording signal, an electrical signal indicating the quantity of reflected light based upon a forward sub-spot, namely, a sub-spot disposed before the main spot is delayed by a time which is determined by both a distance between the sub-spots and a linear velocity of a track in the moving direction thereof, namely, a recording linear velocity, and the electrical signal thus delayed is compared with an electrical signal indicating the quantity of reflected light based upon a backward sub-spot, namely, a sub-spot disposed behind the main spot, to form a tracking error signal on the basis of a difference between these electrical signals, thereby removing PCM signal components detected by the sub-spots.

Thus, no erroneous tracking operation is performed even when a flaw or the like is present on an optical disc, and an actuator is prevented from causing noise on the basis of a recording signal, namely, a PCM signal.

The present invention will be apparent from the following detailed description taken in conjunction with the accompanying drawings, in which:

FIGS. 2a to 2d are diagrammatic views for explaining a method of detecting a relative position of a main laser spot for a track, and show positional relations between a track on an optical disc and laser spots;

FIGS. 3A to 3C are waveform charts for explaining the present invention;

Now, an embodiment of the present invention will be explained below, with reference to the drawings.

Figure 1:
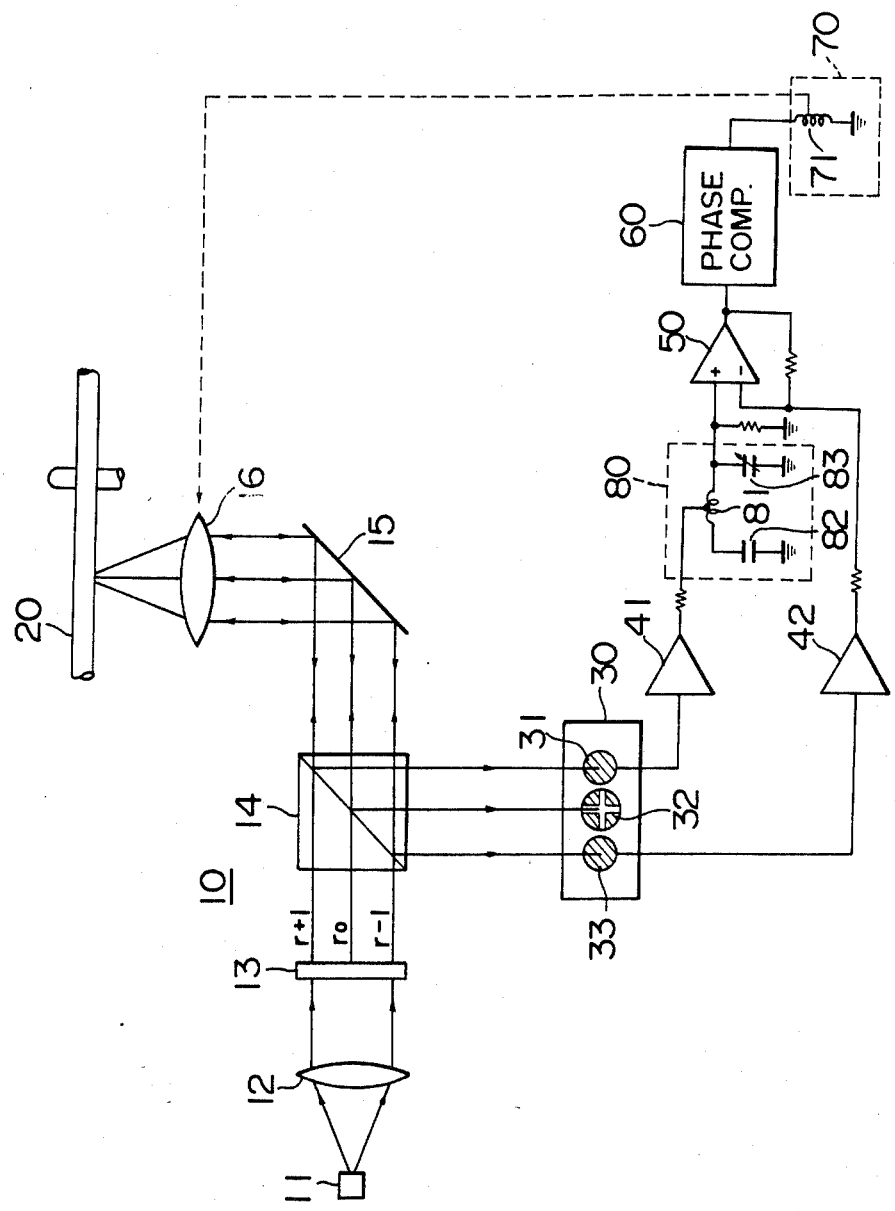
FIG. 1 is a schematic view showing an embodiment of the present invention.
Figure 4:
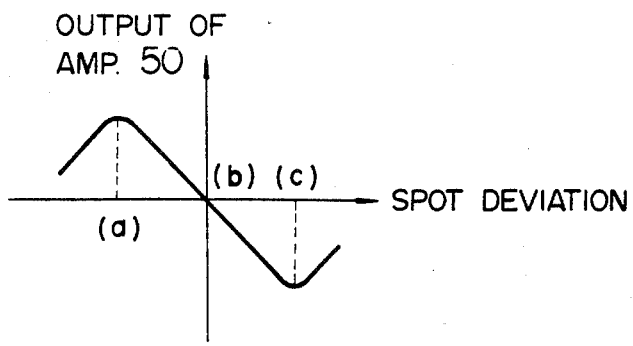
FIG. 4 is a view showing an output waveform appearing in the embodiment shown in FIG. 1.
Figure 5:
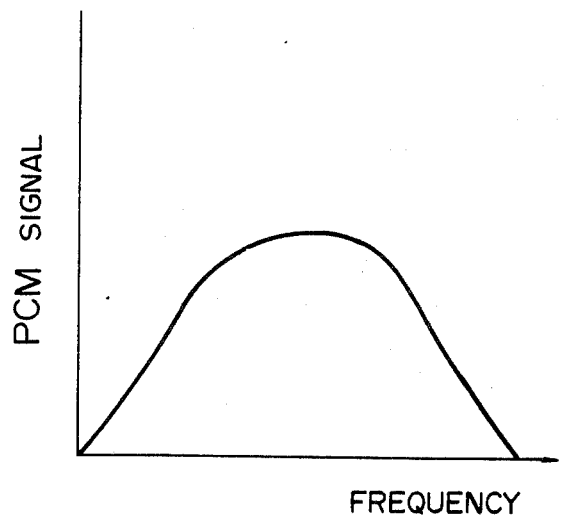
FIG. 5 is a graph showing a frequency spectrum of a PCM signal.

FIG. 1 shows an outline of a device for detecting a tracking error by the three-spot method. In FIG. 1, reference numeral 10 designates an optical system, and 11 a point source of light, for example, a semiconductor laser included in the optical system 10. Laser light from the semiconductor laser 11 impinges upon a diffraction grating 13 through a lens 12. The grating 13 produces diffracted light beams of a plus-first order ($r_{+1}$), a zeroth order ($r_o$) and a minus-first order ($r_{-1}$) at the position designated in FIG. 1. These light beams fall on the lower surface of a disc 20 through a half prism, namely, a beam splitter 14, a rectangular prism 15 and an objective lens 16, so that a row of small pits 21a, 21b and 21c forming a track provided on the above-mentioned lower surface is illuminated with these light beams as shown in FIG. 2. In FIG. 2, reference symbol $S_o$ designates a main spot which is formed by the diffracted light beam of zeroth order incident upon the center line of a track and used for reading out a signal on the track, and $S_{+1}$ and $S_{-1}$ sub-spots which are formed by the diffracted light beams $r_{+1}$ and $r_{-1}$ of the plus- and minus-first order incident respectively upon one and the other edge portions of the track and used for detecting a tracking error. The light beams $r_{+1}$, $r_o$ and $r_{-1}$ incident upon the disc 20 for forming the light spots $S_{+1}$, $S_o$ and $S_{-1}$ are reflected from and modulated by the track, namely, the pits on the disc 20, and then pass through the objective lens 16, rectangular prism 15 and half prism, namely, beam splitter 14, to be focussed on photodetectors, for example, photodiodes 31, 32 and 33 of a photodetection unit 30. The photodetectors 32 converts the intensity of reflected light from the main spot $S_o$ (in other words, a change in intensity of reflected light due to the presence or absence of pits) into an electrical signal, namely, a photocurrent. The photodetectors 31 and 33 convert the intensity of reflected light from a corresponding one of the sub-spots $S_{+1}$ and $S_{-1}$ into an electrical signal, namely, a photocurrent. The electrical signals obtained by the photodiodes 31 and 33 are supplied to current/voltage converters 41 and 42, respectively. The converters 41 and 42 converts the electrical signals from the photodetectors 31 and 33, namely, the photocurrents into voltages, and deliver, for example, waveforms shown in FIGS. 3A and 3B. FIG. 3A shows a voltage output of the converter 41 corresponding to the quantity of reflected light based upon the sub-spot $S_{+1}$, and FIG. 3B a voltage output of the converter 42 corresponding to the quantity of reflected light based upon the sub-spot $S_{-1}$. In FIGS. 3A and 3B, reference symbol $V_o$ designates the average level of the voltage output of the converter 41, and $V_o'$ that of the voltage output of the converter 42. We consider first a case wherein the low pass filter 80 is not used. These voltage outputs are applied to positive and negative input terminals of a differential amplifier 50, which delivers a tracking error signal corresponding to a difference between the average levels $V_o$ and $V_o'$. In the case where accurate tracking is made by the light spots $S_{+1}$, $S_o$ and $S_{-1}$ as shown in FIG. 2b, the average output level $V_o$ of the converter 41 corresponding to the quantity of reflected light based upon the sub-spot $S_{+1}$ is equal to the average output level $V_o'$ of the converter 42 corresponding to the quantity of reflected light based upon the sub-spot $S_{-1}$, the tracking error output of the differential amplifier 50 is equal to zero. In the case where the main spot together with the sub-spots deviates from a track as shown in FIGS. 2a and 2c, the quantity of light reflected from the pits with the sub-spot $S_{+1}$ differs from the quantity of light reflected from the pits with the sub-spot $S_{-1}$. The differential amplifier 50 delivers an output corresponding to the diffeence between the above-mentioned light quantities. FIG. 4 shows the variation of the output of the differential amplifier with the deviation of the main spot from a track. When a tracking error signal appears on the output of the differential amplifier 50, the tracking error signal is supplied through an amplifying/phase-compensating circuit 60 to a tracking coil 71 which is included in an actuator 70 for driving the objective lens 16. Upon the application of the tracking error signal to the coil 71, the actuator 70 drives the objective lens 16 in a well-known manner. Thus, the position of the main spot can be corrected.

According to the above-mentioned three-spot method, when accurate tracking is made, that is, when the light spots are normally placed as shown in FIG. 2b, the two outputs of the current/voltage converters 41 and 42, corresponding to the quantities of reflected light based upon the sub-spots $S_{+1}$ and $S_{-1}$, respectively, are equal.

And the tracking error signal is not delivered from the differential amplifier 50. However, in the case where, as shown in FIG. 2d, a flaw or fault is present in that portion of the pit 21b which is bounded by a broken line, the voltage output corresponding to the quantity of reflected light based upon the sub-spot $S_{+1}$ is decreased when the sub-spot $S_{+1}$ is placed on the flaw. In the worst case, the above voltage output is substantially zero, and therefore only the voltage output corresponding to the quantity of reflected light based upon the sub-spot $S_{-1}$ is delivered from the differential amplifier 50. Thus, the tracking error signal is abruptly generated, and acts as spike noise. The actuator 70 is operated from the spike noise, and thus the objective lens 16 is unnecessarily driven. As a result, the light spots $S_{+1}$, $S_o$ and $S_{-1}$ may jump to the left adjacent track.

Further, since the sub-spots $S_{+1}$ and $S_{-1}$ run on a track, the outputs of the photodetectors 31 and 33 contain part of the recorded signal, namely, the PCM signal which has been recorded on the track. The recorded signal outputted from the photodetectors 31 and 33 is mixed in the output of the differential amplifier 50. And a low frequency component of the signal affects the actuator in the servo system. When the positive and negative input terminals of the differential amplifier 50 are applied with, for example, signals shown in FIGS. 3A and 3B, the amplifier 50 delivers not only the tracking error signal, namely, $V_o - V_o'$ but also a signal component which is left uncancelled between the recorded signal component, namely, the PCM signal component shown in FIG. 3A and the recorded signal component shown in FIG. 3B. In other words, the PCM signal component left uncancelled is superposed on the tracking error signal, and the former causes the actuator 70 to vibrate, thereby bringing about the previously-mentioned drawback, that is, noise due to the vibration of the actuator.

In order to eliminate such drawbacks, according to an embodiment of the present invention, a delay circuit, for example, a low-pass filter 80 is provided on a transmission line for converting the quantity of reflected light based upon the sub-spot $S_{+1}$ which is disposed before the main spot, into an electrical signal and for sending the electrical signal thus obtained to one input terminal, namely, the positive terminal of the differential amplifier 50. In more detail, the delay circuit is provided at the preceding stage of the positive input terminal of the amplifier 50. Thus, the electrical signal corresponding to the quantity of reflected light based upon the forward sub-spot $S_{+1}$ is delayed by a time T which is determined by the distance between the forward and backward sub-spots $S_{+1}$ and $S_{-1}$ and the recording linear velocity. Then, a difference between the electrical signal thus delayed and the electrical signal corresponding to the quantity of reflected light based upon the backward sub-spot $S_{-1}$ is used for obtaining a tracking error signal.

When the electrical signal corresponding to the quantity of reflected light based upon the forward sub-spot $S_{+1}$, as mentioned above, is delayed by a predetermined time, the electrical signal thus delayed and the electrical signal corresponding to the quantity of reflected light based upon the backward sub-spot are detected substantially at the same time for the same portion of the track. Accordingly, even if a flaw or fault is present in that surface of the optical disc where the pits are formed, the erroneous tracking operation based upon the previously-mentioned anomalous spike noise can be prevented.

Further, the recording signal, namely, the PCM signal read out by the forward sub-spot and that read out by the backward sub-spot cancel each other at the differential amplifier 50. Accordingly, the vibration of the actuator due to the recording signal and the noise caused by such vibration can be prevented.

In the above explanation of the embodiment, the delay time T of the delay circuit, for example, low-pass filter 80 is kept constant. However, for some optical discs, the recording linear velocity differs from an ordinary value. In order that the present invention is applicable to any optical disc, the delay time of the delay circuit may be made variable, for example, by using a variable capacitor for the capacitor 83 in the low-pass filter 80.

We claim:

1. A tracking servo circuit for an optical disc reproducing device comprising:

a light source;

an optical system receiving light from said light source for focussing said light by an objective lens on a spiral track of a disc so as to form on said spiral track a main spot ($S_o$) for reading out a recording signal and forward and backward sub-spots ($S_{+1}$, $S_{-1}$) for detecting the deviation of the center of said main spot from a track for reading out said recording signal by said main spot, in such a manner that said forward and backward sub-spots are disposed before and behind said main spot and shift from each other in the direction of the width of said track to be placed on both sides of the center of said main spot in said direction;

photodetection means including a first photodetector for converting the quantity of reflected light based upon said forward sub-spot into a first electrical signal, and a second photodetector for converting the quantity of reflected light based upon said backward sub-spot into a second electrical signal;

a delay circuit connected to said first photodetector for delaying said first electrical signal corresponding to the quantity of reflected light based upon said forward sub-spot by a delay time T, said delay time being determined by a distance between said forward and backward sub-spots and a recording linear velocity;

circuit means connected to said second photodetector and said delay circuit for comparing said second electrical signal corresponding to the quantity of reflected light based upon said backward sub-spot with said first electrical signal delayed by said delay circuit, to take out a difference between said electrical signals as a tracking error signal when said first electrical signal delayed by said delay circuit and said second electrical signal become unbalanced due to the deviation of said sub-spots from said track; and tracking control means connected to said circuit means for driving said objective lens on the basis of an output signal from said circuit means to control the position of said main spot so that the center of said main spot is placed on the center line of said track.

2. A tracking servo circuit for an optical disc reproducing device according to claim 1, wherein said delay circuit is a low-pass filter.

3. A tracking servo circuit for an optical disc reproducing device according to claim 1, wherein said delay circuit includes means for making said delay time variable.

* * * * *